(12) United States Patent
Swindle et al.

(10) Patent No.: US 12,665,830 B2
(45) Date of Patent: Jun. 23, 2026

(54) NAMESPACES FOR PROTECTED MULTI-TENANT PACKET PROCESSING PIPELINES

(71) Applicant: Microsoft Technology Licensing, LLC, Redmond, WA (US)

(72) Inventors: Christopher Neil Swindle, Biggleswade (GB); Alan David Elder, Welwyn Garden City (GB); Matthew Ian Ronald Williams, London (GB); Michael Jeffrey Evans, Harpenden (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 302 days.

(21) Appl. No.: 18/593,115

(22) Filed: Mar. 1, 2024

(65) Prior Publication Data
US 2025/0279950 A1     Sep. 4, 2025

(51) Int. Cl.
*H04L 43/10* (2022.01)
*H04L 41/147* (2022.01)
*H04L 49/00* (2022.01)

(52) U.S. Cl.
CPC ............ *H04L 43/10* (2013.01); *H04L 41/147* (2013.01); *H04L 49/3063* (2013.01)

(58) Field of Classification Search
CPC .... H04L 43/10; H04L 41/147; H04L 49/3063
See application file for complete search history.

(56) References Cited

U.S. PATENT DOCUMENTS

| | | | | |
|---|---|---|---|---|
| 10,318,013 B1 * | 6/2019 | Banks | ..................... | G06F 9/541 |
| 2003/0135351 A1 * | 7/2003 | Wilkinson, III | .... | G06F 15/8053 |
| | | | | 702/186 |
| 2003/0191866 A1 * | 10/2003 | Wolrich | ............. | G06F 9/30123 |
| | | | | 712/E9.027 |
| 2012/0219002 A1 * | 8/2012 | Sobaje | ................... | H04L 49/90 |
| | | | | 370/392 |
| 2015/0016469 A1 * | 1/2015 | Ganichev | ................ | H04L 43/20 |
| | | | | 370/429 |
| 2015/0063360 A1 * | 3/2015 | Thakkar | .................. | H04L 49/70 |
| | | | | 370/400 |
| 2016/0226822 A1 * | 8/2016 | Zhang | ................. | H04L 41/0654 |
| 2016/0359880 A1 * | 12/2016 | Pang | ................... | G06F 9/45558 |

\* cited by examiner

*Primary Examiner* — Brenda H Pham
(74) *Attorney, Agent, or Firm* — Han Gim; Newport IP, LLC

(57) ABSTRACT

A programmable multi-stage packet processing pipeline executing in a data plane of a software-defined networking (SDN) network handles data packets according to objects in a directed graph that are programmed using multiple separate namespaces. Each namespace provides isolation for programming in the processing stages to provide protection for the pipeline that may span across multiple different tenant domains. While programming is handled using separate namespaces, the programmed stages are converted into executable code that runs in a single data plane of the SDN network to optimize data packet flow while minimizing latency.

20 Claims, 16 Drawing Sheets

100

100

UE = User equipment
RAN = Radio access network
CN = Core network
DN = Data network
MEC = Multi-access edge compute

Programming link — Type 1

*FIG 9B*

Programming link — Type 2

1000

1100

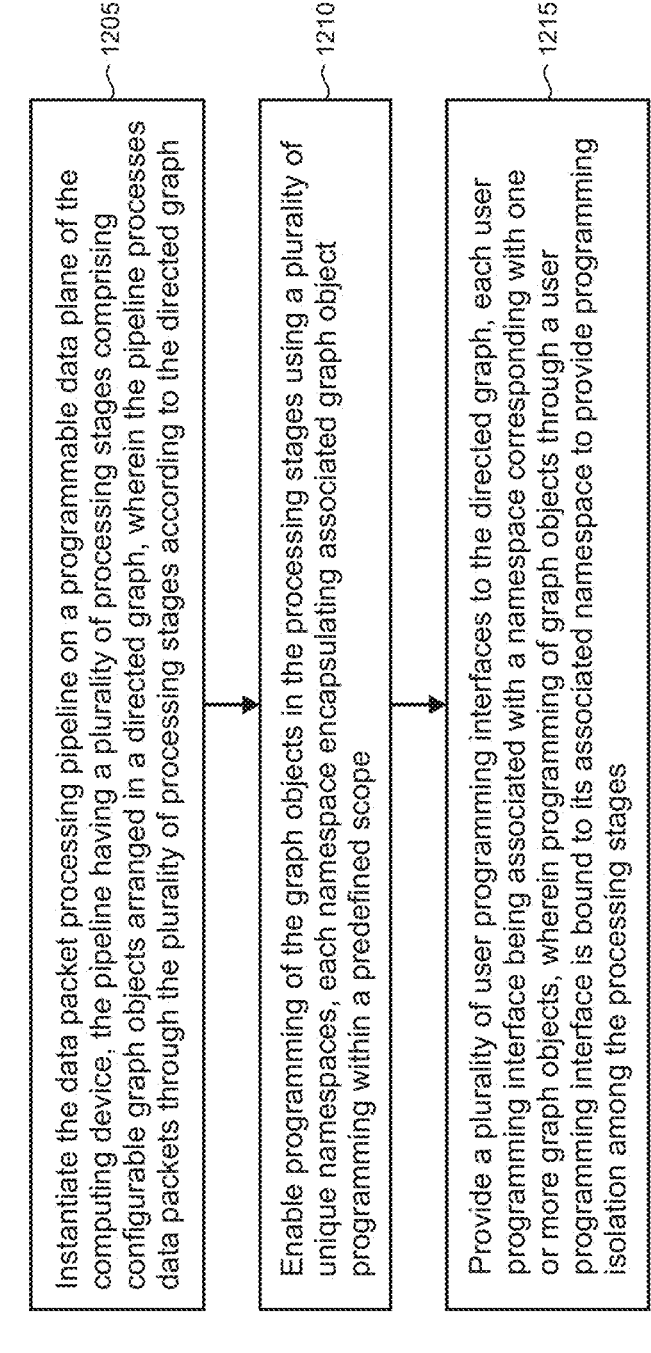

Instantiate the data packet processing pipeline on a programmable data plane of the computing device, the pipeline having a plurality of processing stages comprising configurable graph objects arranged in a directed graph, wherein the pipeline processes data packets through the plurality of processing stages according to the directed graph — 1205

Enable programming of the graph objects in the processing stages using a plurality of unique namespaces, each namespace encapsulating associated graph object programming within a predefined scope — 1210

Provide a plurality of user programming interfaces to the directed graph, each user programming interface being associated with a namespace corresponding with one or more graph objects, wherein programming of graph objects through a user programming interface is bound to its associated namespace to provide programming isolation among the processing stages — 1215

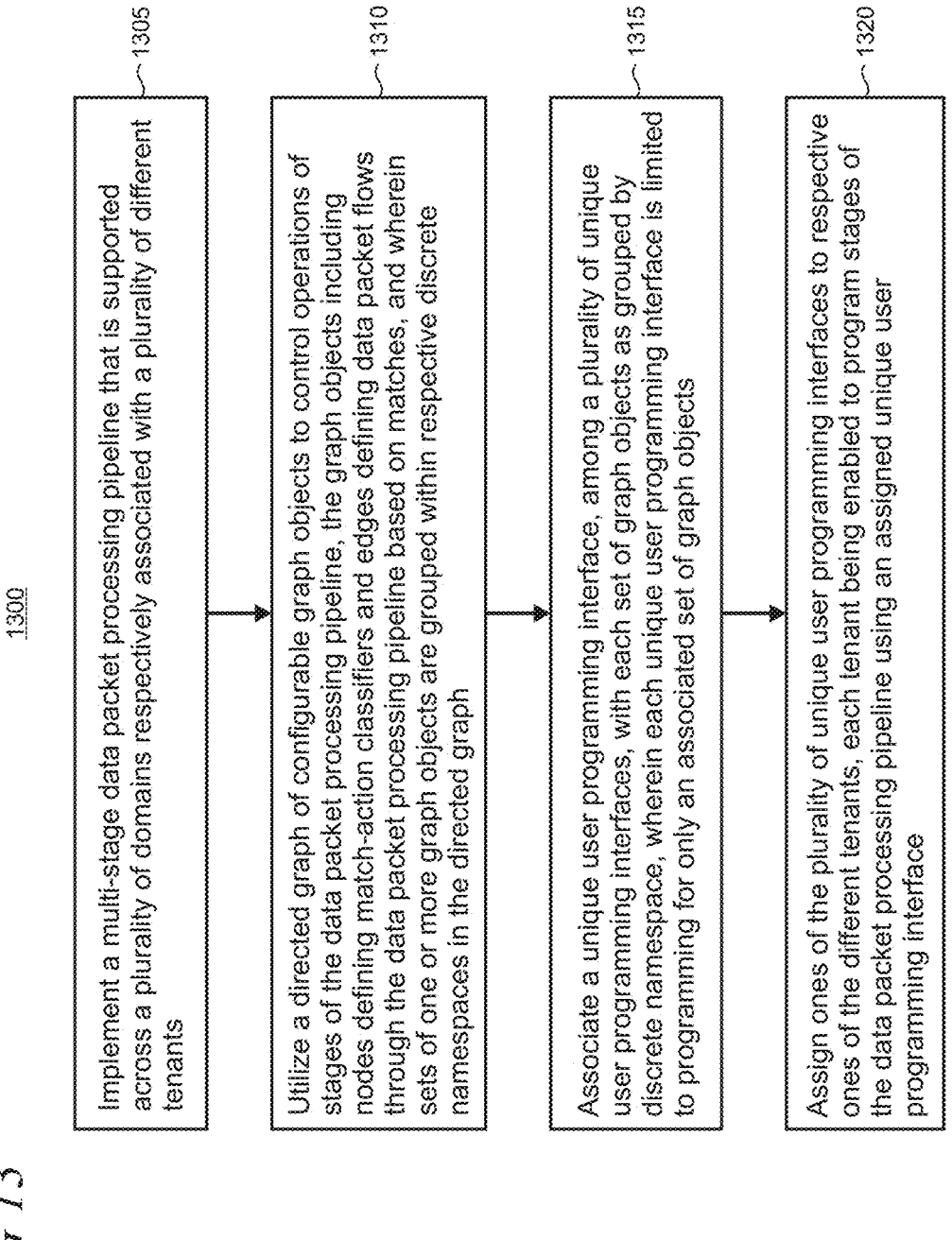

1305 — Implement a multi-stage data packet processing pipeline that is supported across a plurality of domains respectively associated with a plurality of different tenants 1310 — Utilize a directed graph of configurable graph objects to control operations of stages of the data packet processing pipeline, the graph objects including nodes defining match-action classifiers and edges defining data packet flows through the data packet processing pipeline based on matches, and wherein sets of one or more graph objects are grouped within respective discrete namespaces in the directed graph 1315 — Associate a unique user programming interface, among a plurality of unique user programming interfaces, with each set of graph objects as grouped by discrete namespace, wherein each unique user programming interface is limited to programming for only an associated set of graph objects 1320 — Assign ones of the plurality of unique user programming interfaces to respective ones of the different tenants, each tenant being enabled to program stages of the data packet processing pipeline using an assigned unique user programming interface

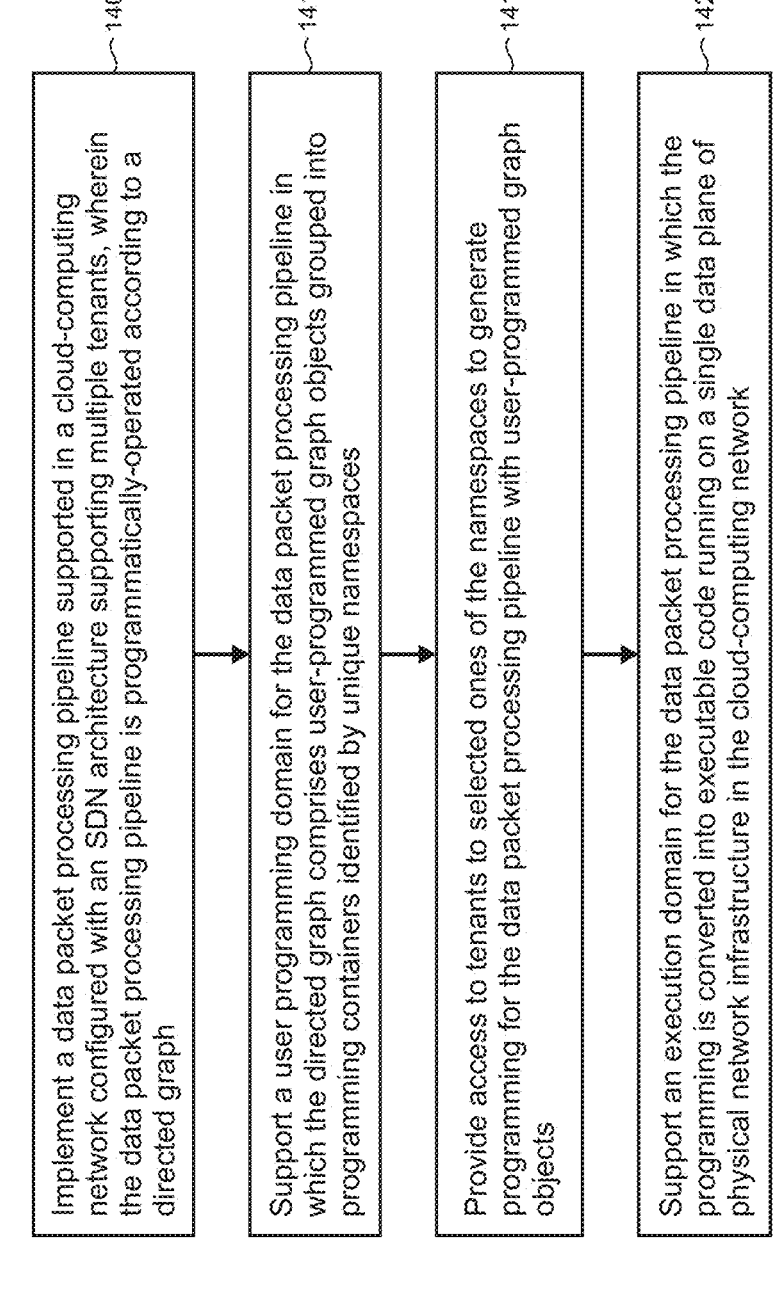

Implement a data packet processing pipeline supported in a cloud-computing network configured with an SDN architecture supporting multiple tenants, wherein the data packet processing pipeline is programmatically-operated according to a directed graph ⌐1405

Support a user programming domain for the data packet processing pipeline in which the directed graph comprises user-programmed graph objects grouped into programming containers identified by unique namespaces ⌐1410

Provide access to tenants to selected ones of the namespaces to generate programming for the data packet processing pipeline with user-programmed graph objects ⌐1415

Support an execution domain for the data packet processing pipeline in which the programming is converted into executable code running on a single data plane of physical network infrastructure in the cloud-computing network ⌐1420

1500

1600

1700

NAMESPACES FOR PROTECTED MULTI-TENANT PACKET PROCESSING PIPELINES

BACKGROUND

Information technology (IT) resources, such as compute and storage resources, are increasingly distributed into cloud environments that share the underlying IT infrastructure among multiple tenants. Data processing in either or both on-premises and cloud infrastructure may be handled by a pipeline that processes data packets through various stages.

SUMMARY

Disclosed are a method, computer-readable storage device, and computing device configured for processing data packets in a multi-stage pipeline in a communications network that is programmable according to a directed graph of objects representing processing stages and packet flows through the pipeline. Rather than utilize a single global namespace for programming the entire directed graph, multiple unique namespaces function as containers that are associated with groups of graph objects. Users create and define graph objects through respective programming interfaces to the namespaces. Each unique namespace encapsulates the associated graph object programming within a predefined scope and defines public interfaces for other namespaces to access, and defines interfaces to network resources. Isolation is enforced among groups of graph objects, which are only programmable by users through assigned programming interfaces to associated namespaces, to provide protection to the pipeline against security vulnerabilities by limiting users' programming access to pre-determined parts of the pipeline that they are authorized to access.

Users work through assigned interfaces to chain groups of graph objects together to form services in a programming domain. However, the separation of namespaces and programming interfaces is only enforced in the programming domain—chained services are instantiated at runtime in an execution domain by mapping all of the namespace programming into a single graph. The graph objects are converted into code that executes in a data plane of a software-defined networking (SDN) network. Such mapping ensures that the data plane operates efficiently with minimal latency by reducing the processing overhead associated with chaining services conventionally (e.g., using packet queuing when passing packets among service functions).

In an illustrative embodiment, the programmable graph objects include nodes and edges in which the nodes represent match-action classifiers and the edges represent matches that determine packet flow between processing stages. The programming of the graph objects is bound to its associated namespace. The match-action classifiers use match-action rules to process packets, for example, by matching filtering criteria to fields in packet headers and responsively applying actions to the packets associated with the matched rules such as discarding, modifying, or forwarding the packet to other nodes.

In an illustrative embodiment, a packet processing pipeline spans multiple tenant domains instantiated in an SDN network supporting the pipeline. Programming interfaces to namespaces and the associated graph objects that control pipeline processing are distributed and assigned among the different tenants. Cross-tenant programming is enabled through application programming interfaces that are defined and exposed by the namespaces while maintaining the pipeline protection and security benefits of the separate isolated programming domains.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 8 shows an illustrative namespace that encapsulates graph objects and defines interfaces to other namespaces and SDN resources;

FIGS. 9A and 9B show illustrative namespaces that may be used to program edge graph objects;

FIGS. 12, 13, and 14 show illustrative methods that may be performed when implementing the present namespaces for protected multi-tenant packet processing pipelines;

Like reference numerals indicate like elements in the drawings. Elements are not drawn to scale unless otherwise indicated.

DETAILED DESCRIPTION

Figure 1:
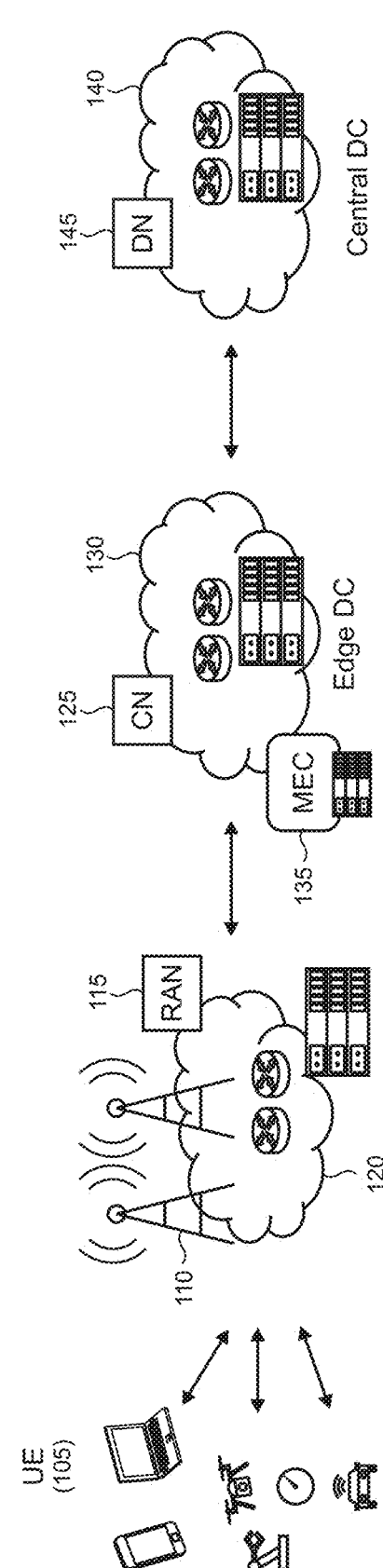
FIG. 1 shows an illustrative 5G (5th generation) mobile network with which principles associated with the present namespaces for protected multi-tenant packet processing pipelines are applicable.

The development of service-based network architectures in the fifth generation (5G) of mobile networks has provided technologies including Network Function Virtualization (NFV) and Software-defined Networking (SDN) that enable a wide variety of services to be flexibly and dynamically provisioned. An additional feature of 5G service-based architectures includes the concept of separating control and data plane functionalities to facilitate independent scalability, evolution, and flexible deployment of services using cloud-computing, implemented across, for example, centrally-located computing infrastructure and/or distributed computing infrastructure.

Wireless 5G networking is frequently utilized in communication networks that can encompass consumer and enterprise networks to support access to a variety of applications, services, and resources including the Internet. Applications and services commonly leverage the high bandwidth and low latency enabled by modern communication networks to provide compelling user experiences and support feature-rich capabilities for a wide variety of connected devices (both fixed and mobile).

A common approach to service-based network data processing utilizes a pipeline design in which packets of data having a defined format in workloads from various and different network sources are passed among pipeline stages. Packet processing pipelines are configured to perform various operations on packets such as applying policies, modifying or transforming data, and forwarding the packet in a process chain. While conventional pipeline designs provide effective data processing solutions in some applications, packet handling in pipelines may be susceptible to the introduction of unwanted latency and reduction of throughput as packets are passed among pipeline stages.

Multi-tenant SDN platforms are increasingly common as cloud-computing infrastructure becomes more ubiquitous and cost-effective and new paradigms such as network slicing are utilized. The term "tenant" is a logical separation among entities and may include, for example and not by way of limitation, different organizations, enterprises, customers, or businesses. Different tenants can also be part of the same organization, such as different departments (e.g., engineering, operations, customer service, etc.) in the same company.

Multi-tenant SDN platforms utilize commonly-shared computing infrastructure and resources that are virtualized to support different discrete tenant domains that are operated separately in accordance with individual application policies. While operations of multi-tenant SDN platforms are typically transparent, tenants nonetheless require high security assurances for network operations and seek isolation for their tenant domain to restrict access to confidential and proprietary information and reduce the size of attack surfaces to bad actors.

Packet processing pipeline performance is improved with increased security in multi-tenant scenarios by the present principles in which a programmable multi-stage packet processing pipeline executing in a data plane of an SDN network handles data packets according to objects in a directed graph that are programmed using multiple separate namespaces. Each namespace provides isolation for programming in the processing stages to provide protection for the pipeline that may span across multiple different tenant domains. While programming is handled using separate namespaces, the programmed stages are converted into executable code that runs in a single data plane of the SDN network to optimize data packet flow while minimizing latency.

Turning now to the drawings, FIG. 1 shows an illustrative 5G ($5^{th}$ generation) mobile network 100 that provides an exemplary use case with which the present namespaces for protected multi-tenant packet processing pipelines may be utilized. User equipment (UE) 105, comprising computing devices, such as phones, tablets, personal computers, laptops, and Internet-of-Things (IoT) devices, communicate wirelessly over an air interface with a radio unit (RU) 110. The RU delivers data to a radio access network (RAN) 115. The RAN is commonly implemented virtually on computer networking infrastructure 120 and is referred to as a "vRAN." For example, the infrastructure may comprise a far edge computing network or platform of a mobile operator (MO) or may be incorporated into on-premises equipment of an enterprise.

The RAN 115 is connected to a core network (CN) 125 that is implemented, in this illustrative example, in an edge datacenter (DC) 130 using cloud-computing infrastructure. The edge DC is configurable as a multi-access edge computing (MEC) network 135 in some applications, or it may include MEC functions and features. In some implementations, the MEC network may be incorporated in whole or part in the computer networking infrastructure 120 supporting the RAN 115 (not shown). The edge DC is operatively coupled with a central DC 140 using cloud-computing infrastructure that supports a data network (DN) 145 and other computing resources and services.

Figure 2:
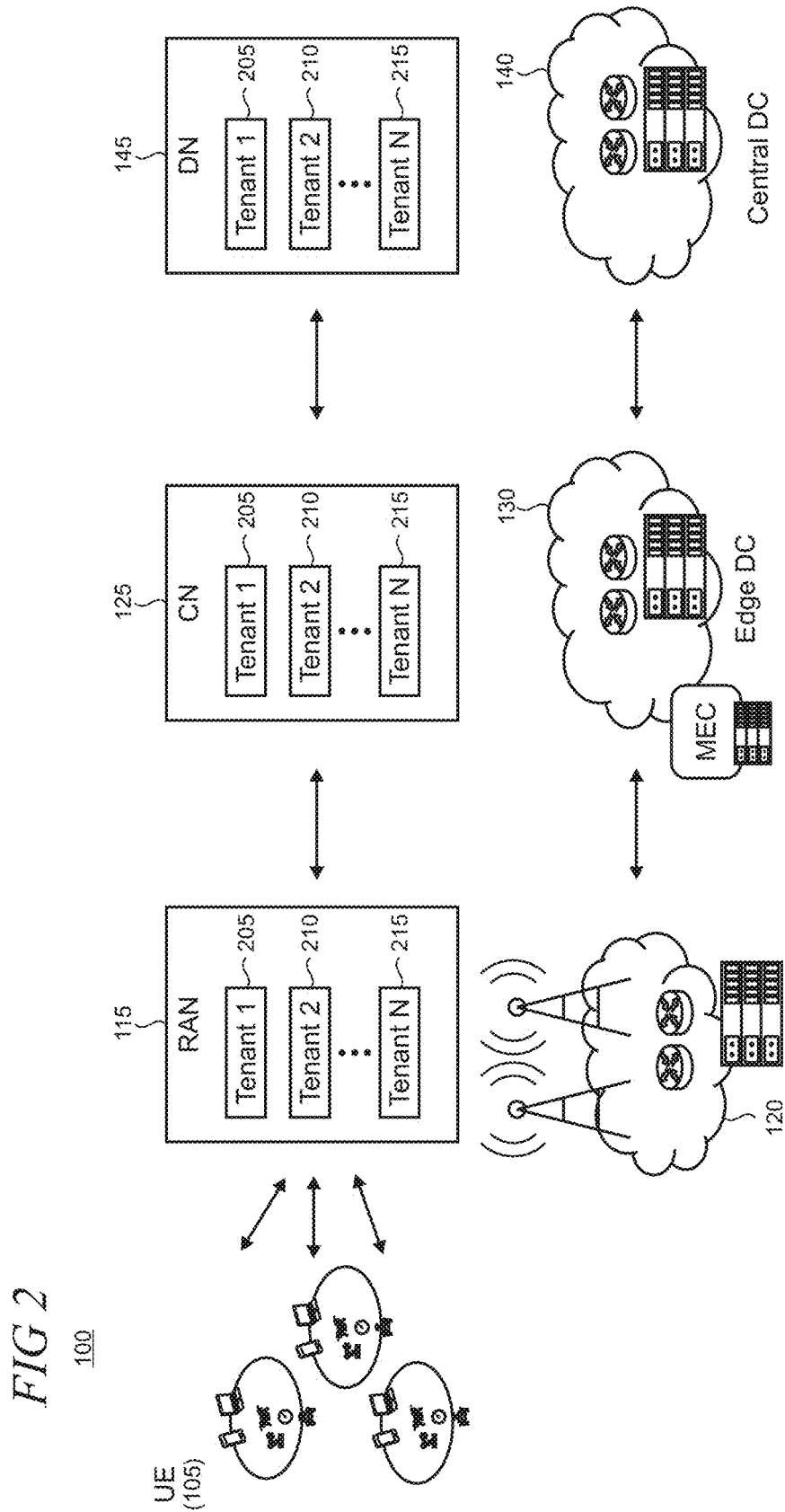
FIG. 2 shows an illustrative multi-tenant use case in which different tenants commonly share 5G network infrastructure and resources.

FIG. 2 shows an illustrative multi-tenant use case in which different tenants 1, 2, . . . N (as respectively indicated by reference numerals 205, 210, and 215) in commonly shared 5G network infrastructure 120, 130, and 140 and associated resources. For example, the RAN 115, CN 125, and DN 145 can be sliced on an end-to-end basis and the network slices distributed among the different tenants. However, it is emphasized that network slicing is merely illustrative and that other ways of sharing network infrastructure and resources among tenants may be utilized as needed to meet the needs of a given implementation.

Figure 3:
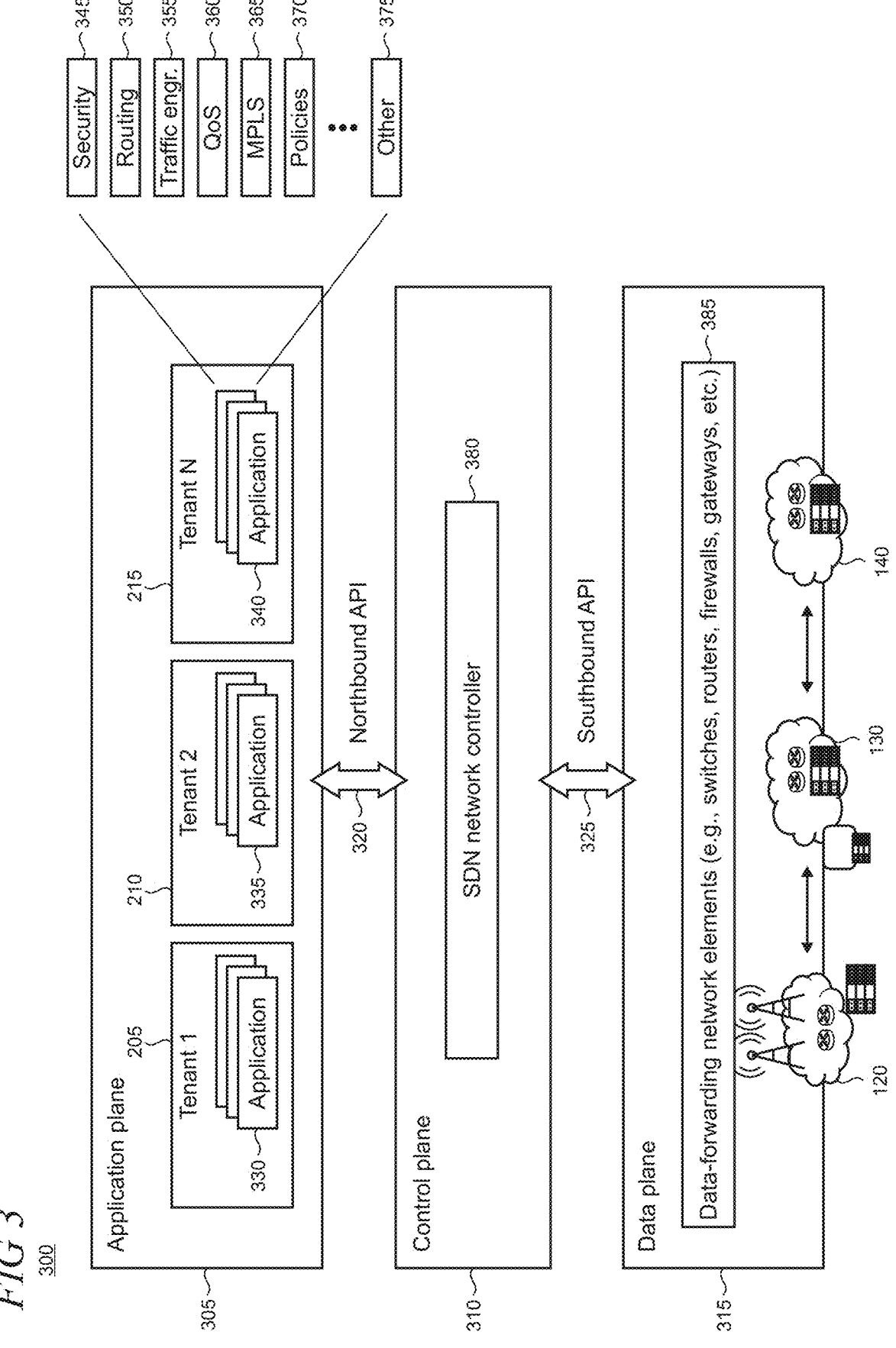
FIG. 3 shows an illustrative software-defined networking (SDN) architecture that provides for an application plane that is supported by separate control and data planes.

The 5G network 100 is architected using NFV and SDN principles. FIG. 3 shows an illustrative software-defined networking (SDN) architecture 300 that provides for an application plane 305 that is supported by separate control 310 and data 315 planes (the data plane is also commonly referred to as a user plane in technical literature and applicable standards). The application and control planes interoperate through a northbound API (application programming interface) 320 and the control and data planes interoperate through a southbound API 325.

The application plane 305 supports sets of various applications 330, 335, and 340 that are respectively associated with the tenants 205, 210, and 215. The types, features, and functions of the applications can vary by implementation. Exemplary applications deal with security 345, routing 350, traffic engineering 355, quality of service (QoS) 360, multiprotocol label switching 365, policies 370, and other suitable subjects 375. The tenant applications are executed separately and in isolation from each other such that dedicated network resources are not shared between programs, and the execution of one tenant program does not impact execution of others. For security purposes, for example, access by packets controlled by one program to data stored by another is typically limited.

The data plane 315 comprises data-forwarding network elements 385 of one or more portions of computing infrastructure 120, 130, and 140 that underlies the SDN architecture 300. Examples of such network elements include, for example, switches, routers, firewalls, gateways, and the like. The data plane is responsible for actual movement of data from one system to another and forwards data based on information provided by an SDN controller 380 in the control plane 310.

Figure 4:
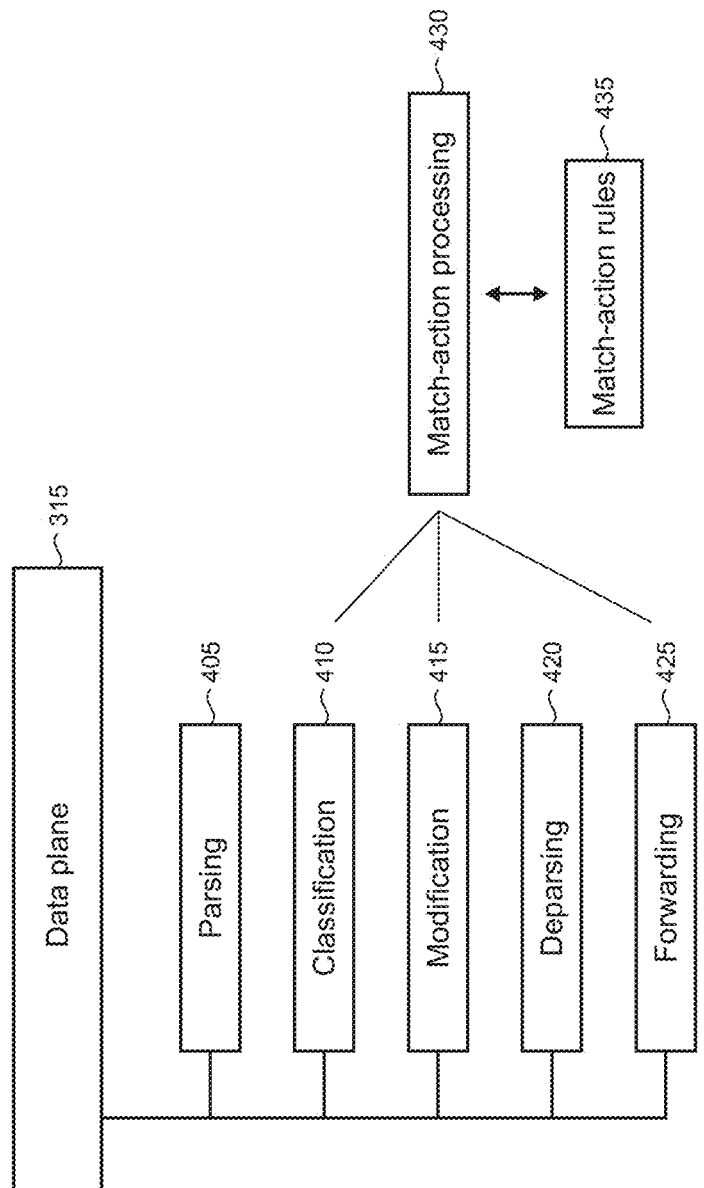
FIG. 4 shows illustrative data plane functions.

The data plane 315 performs a series of operations, including the parsing of packet headers, determining a sequence of processing operations to be applied, and forwarding the packet based on the results of the operations. FIG. 4 shows a taxonomy 400 of illustrative basic data plane functions for packet processing including, for example and without limitation, parsing 405, classification 410, modification 415, deparsing 420, and forwarding 425. Additional data plane functions can support other services such as scheduling, filtering, metering, and traffic shaping.

Parsing is a process of locating protocol headers in the packet buffer and extracting the relevant header fields into packet descriptors (i.e., metadata). Field values are used in classification to match the packet with the corresponding forwarding policy, which describes the forwarding or processing actions to be applied to the packet (e.g., which output interfaces to use, whether to drop the packet, etc.) and the required packet modification actions (e.g., rewriting a header field).

Modification applies the actions retrieved during classification, and can update an internal state, for example, to increment a flow counter. After modifications are applied, packet headers may be re-generated from packet descriptors in deparsing. The packet is sent to a suitable output interface for transmission during forwarding. Forwarding may include application of scheduling policies, for example to enforce network-level QoS policies, and traffic shaping to limit the amount of network resources a given flow or tenant application may consume. The combination of classification, modification, and forwarding based on match-action rules 435 is commonly referred to as match-action processing 430.

Figure 5:
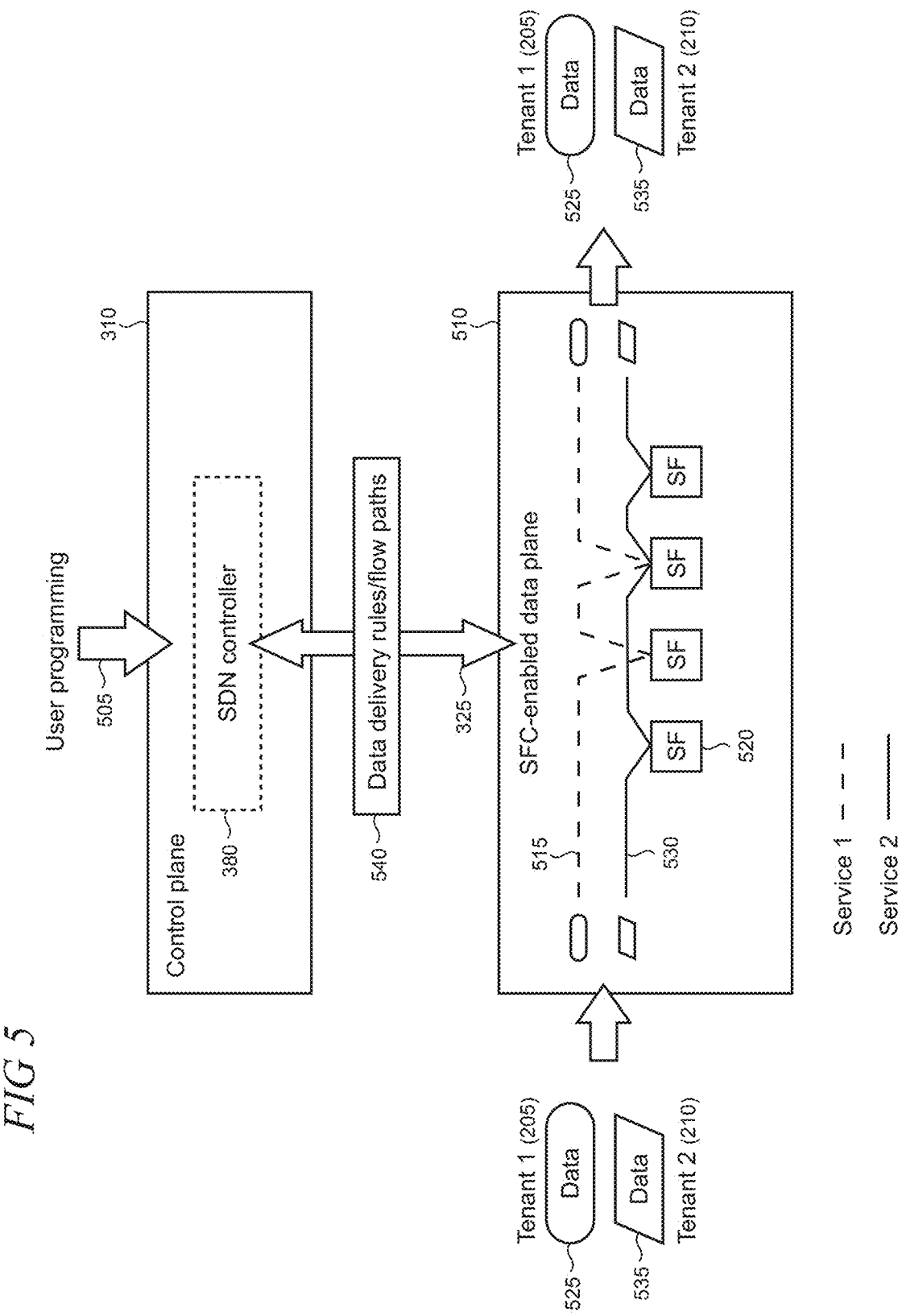
FIG. 5 shows an illustrative example of multi-tenant service function chaining using an SDN controller configured to support user programming.

FIG. 5 shows an illustrative example of multi-tenant service function chaining using the SDN controller 380 which is configured to support user programming 505. Service function chaining leverages NFV and SDN to create a service overlay on top of the physical network elements in the data plane 315 as described, for example, by the IETF (Internet Engineering Task Force) RFC 7665. In service function chaining, data packet flows through the data plane are steered between service functions (SF) that are instantiated at different places in the network. Pipes are built between SF forwarding elements in the overlay using, for example, IP (Internet Protocol) tunnels, MPLS label-switched paths or pseudowires. SFC (service function chaining) encapsulation is provided using a network service header to indicate to which chain of service functions the packet has been assigned and which service function is utilized next.

As shown in FIG. 5, an SFC-enabled data plane 510 supports different services 1 and 2 for respective different tenants 1 and 2. The flow path 515 for service 1 chains together various SFs (representatively indicated by reference numeral 520) through which data packets 525 for tenant 1 are processed. The flow path 530 for service 2 chains together other SFs through which data packets 535 for tenant 2 are processed. In conventional service function chaining, the flow paths are set in the data plane 510 according to data delivery rules 540 provided by the SDN controller 380 over the southbound API 325.

Figure 6:
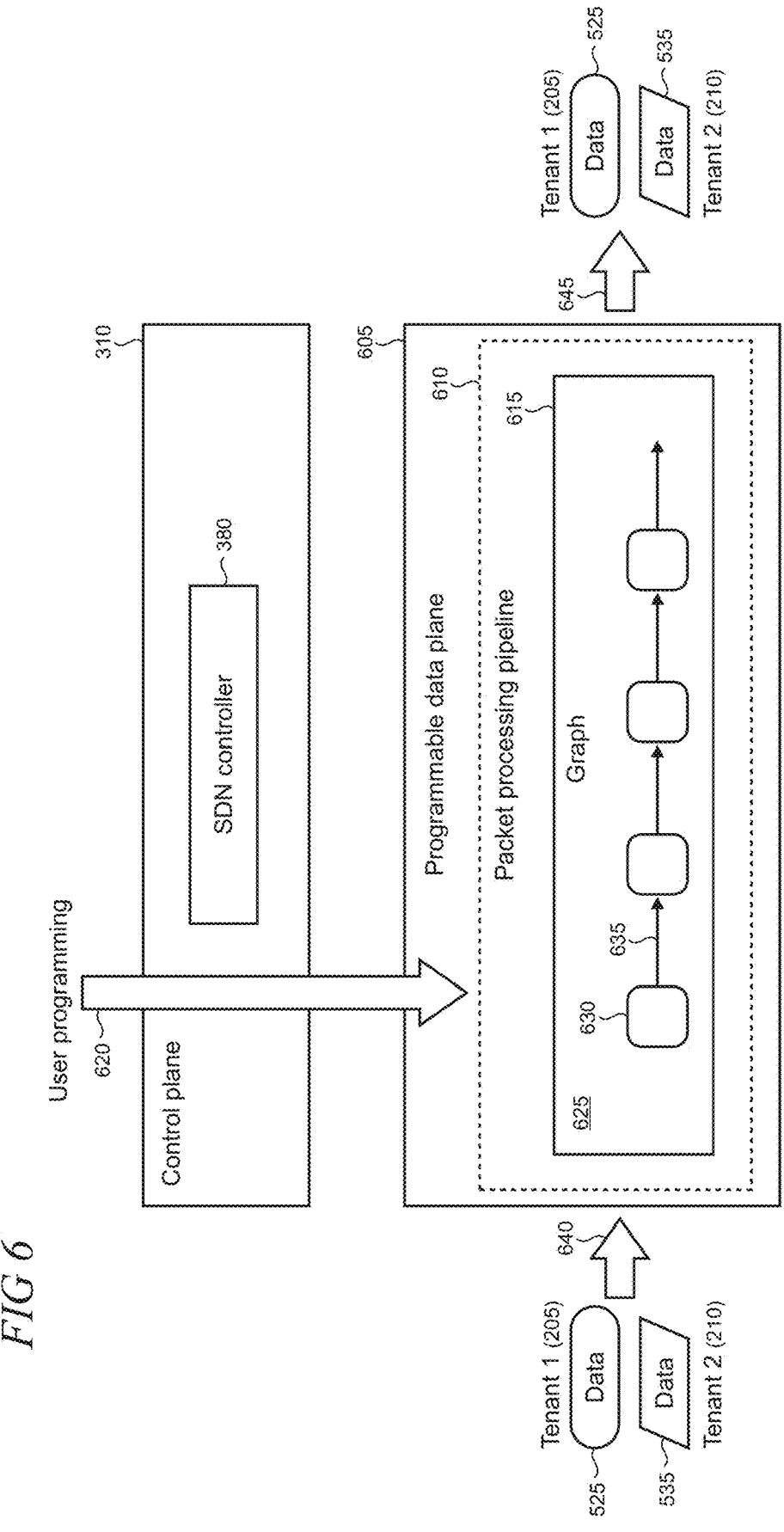
FIG. 6 shows a programmable data plane in which a protected multi-tenant packet processing pipeline is operated in accordance with a directed graph.

FIG. 6 shows a programmable data plane 605 in which a multi-tenant protected packet processing pipeline 610 is operated in accordance with a directed graph 615. In comparison to conventional service function chaining as shown in FIG. 5 and described above, a user programming interface 620 is not supported in the control plane 310. Instead, user programming capabilities extend to the packet processing pipeline to create and configure graph objects 625 in the directed graph. The graph objects include nodes (representatively indicated by reference numeral 630) and edges 635. The nodes represent match-action classifiers and the edges are matches that represent packet flows. The packet processing pipeline receives a stream of tenant packets 525 and 535 at the input 640 to the pipeline, processes the packets in accordance with the directed graph, and provides a stream of tenant packets at the output 645 of the pipeline.

Figure 7:
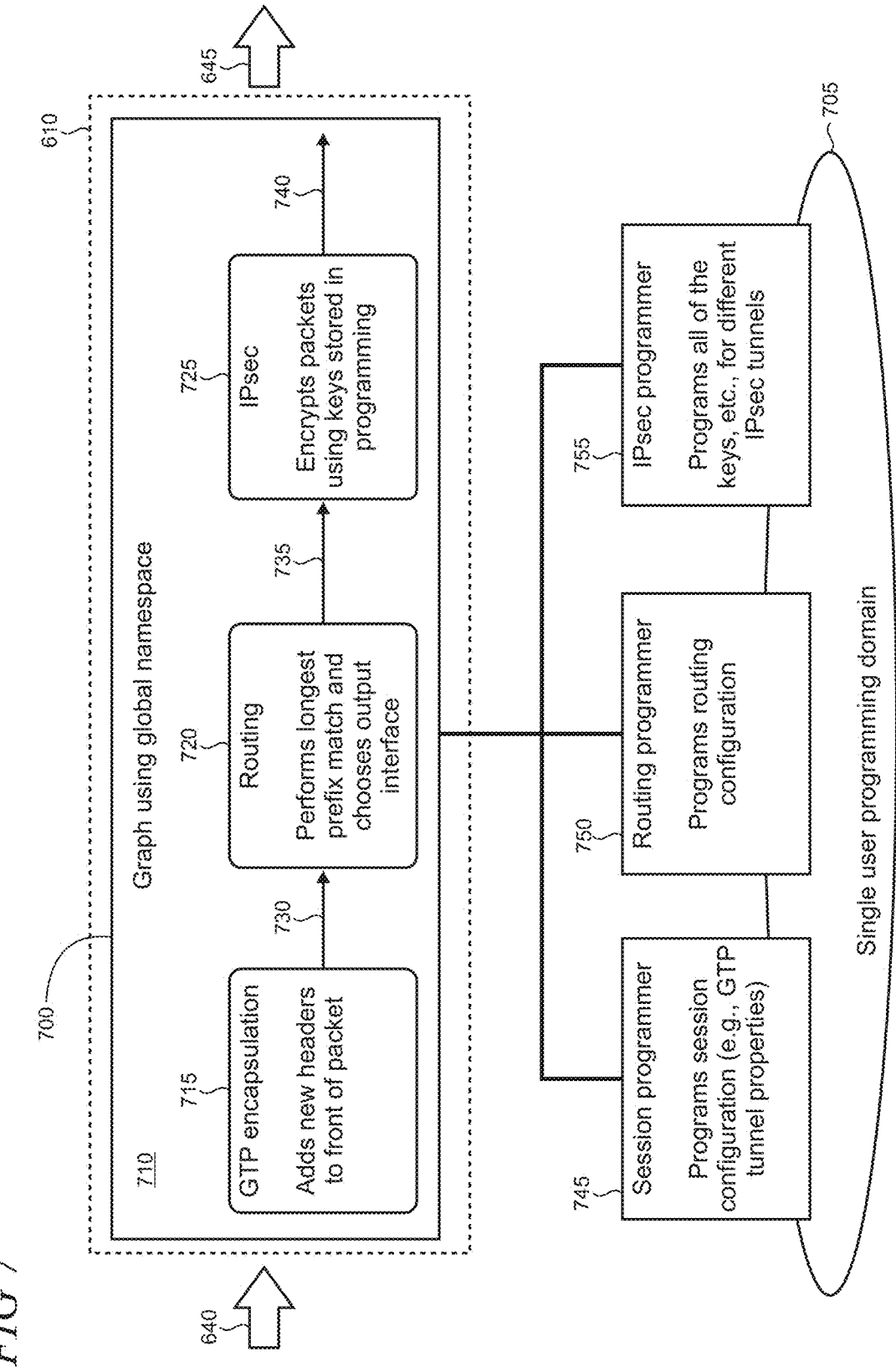
FIG. 7 shows an illustrative directed graph using a global namespace that is programmed through a single user programming domain.

FIG. 7 shows an illustrative directed graph 700 for implementing a service using the packet processing pipeline 610. The directed graph uses a global namespace which is programmed through a single user programming domain 705. The directed graph includes graph objects 710 comprising illustrative nodes 715, 720, and 725 and edges 730, 735, and 740. Node 715 is a GTP (GPRS tunneling protocol) stage that functions to add new headers to the front of a packet. Node 720 is a routing stage that performs longest prefix match and chooses a suitable output interface (a longest prefix match is a routing algorithm that determines the most specific route for a data packet). Node 725 is an IPsec (Internet Protocol Security) stage that encrypts packets using keys stored in the programming.

The graph objects 710 are programmable through respective programmers in the user programming domain 705. These include a session programmer 745 that programs the session configuration, for example, GTP tunnel properties. A routing programmer 750 programs routing configuration for the routing stage 720. An IPsec programmer 755 programs keys for different IPsec tunnels.

The global namespace and single user programming domain can provide satisfactory results in some scenarios, but is less than optimal for use cases that utilize the zero-trust model in which security is implemented by assigning the least required access to perform specific tasks. In this illustrative example, the graph objects 710 in the global graph for service programming are accessible by each of the programmers 745, 750, and 755. Thus, for example, the component adding the GTP headers would also have access to the IPsec component of the programming including the keys used for encryption.

Figures 8, 9A, 9B:
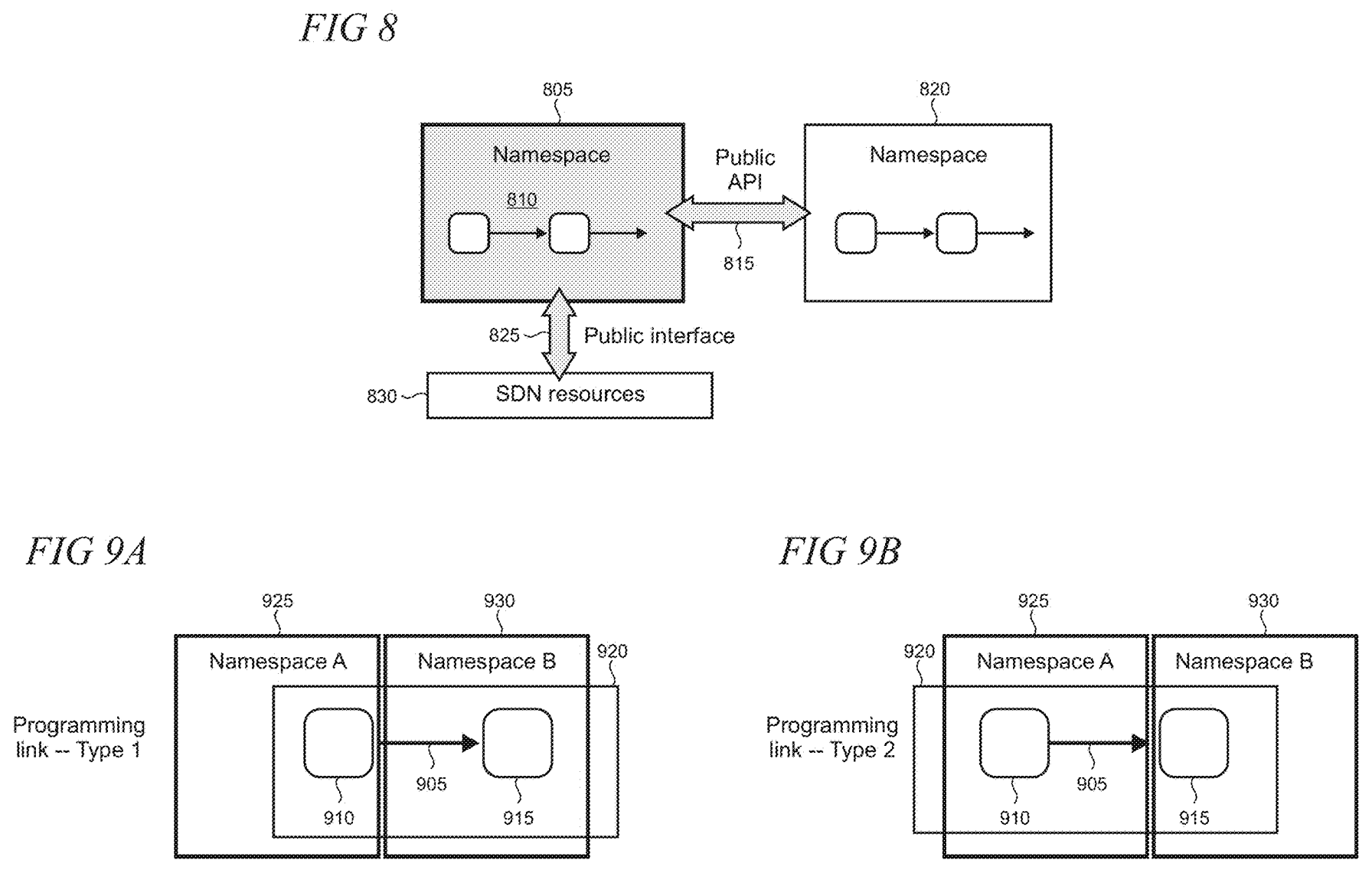

Rather than use a single global graph and associated namespace, the present packet processing pipeline principles are based on the utilization of multiple separate and individual namespaces. FIG. 8 shows an illustrative namespace 805 that encapsulates graph objects 810 within a predefined scope in which programming for the objects is bound to the namespace. The namespace defines one or more public APIs 815 to interoperate with programming in other namespaces (representatively indicated by reference numeral 820) and further defines one or more public interfaces 825 to SDN resources 830 and/or services.

Programming of the graph objects (i.e., nodes and edges) can be linked from different namespaces. For example, as shown in FIGS. 9A and 9B, a given edge 905 is linked to two nodes 910 and 915 in a directed graph 920. FIG. 9A shows an illustrative example of a first type of programming link in which the edge 905 is programmed in a namespace B 930 that is different from the namespace A 925 of node 910 from which the edge originates. FIG. 9B shows an illustrative example of a second type of programming link in which the edge is programmed in namespace A that is different from the namespace B for node 915 to which the edge leads.

Figure 10:
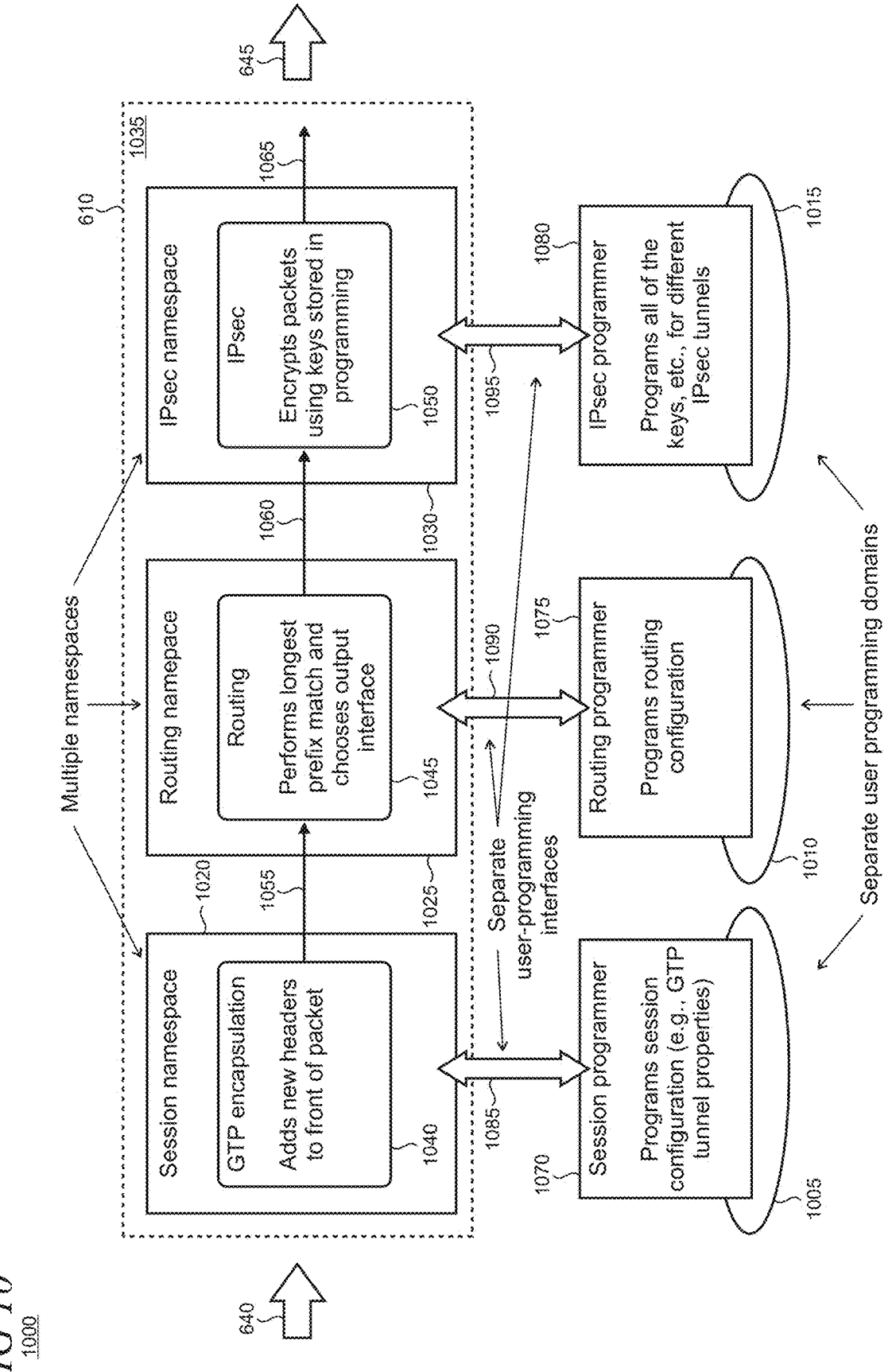
FIG. 10 shows an illustrative directed graph that is programmed through separate and individual user programming domains using multiple namespaces.

FIG. 10 shows an illustrative directed graph 1000 for implementing a service using the packet processing pipeline 610. The directed graph is programmed through separate and individual user programming domains 1005, 1010, and 1015 using multiple namespaces. These include a session namespace 1020, a routing namespace 1025, and an IPsec namespace 1030. The directed graph includes graph objects 1035 comprising illustrative nodes 1040, 1045, and 1050 and edges 1055, 1060, and 1065. The nodes provide respective processing stages in the pipeline including GTP encapsulation, routing, and IPsec encryption.

The graph objects 1035 are programmable through respective programmers 1070, 1075, and 1080 in the respective individual user programming domains 1005, 1010, and 1015. The programmers operate on the graph objects through respective separate and individual user programming interfaces 1085, 1090, and 1095. The provisioning of the separate namespaces and associated programmers and interfaces ensures that isolation is enforced among groups of graph objects, which are only programmable by users (and/ or tenants) through assigned programming interfaces to the associated namespaces.

The binding of programming to namespaces and the isolation provided by the separate programming domains provide protection to the packet processing pipeline to address the security issues arising with the single global namespace. Different users and/or tenants are restricted to programming of only parts of the pipeline to which they are authenticated and authorized to access. The protected packet processing pipeline adheres to the zero-trust model because if any one part of the directed graph programming is compromised or altered (e.g., by a malicious attack), the negative impact is contained to just the affected part and cannot spread to other programming.

Figure 11:
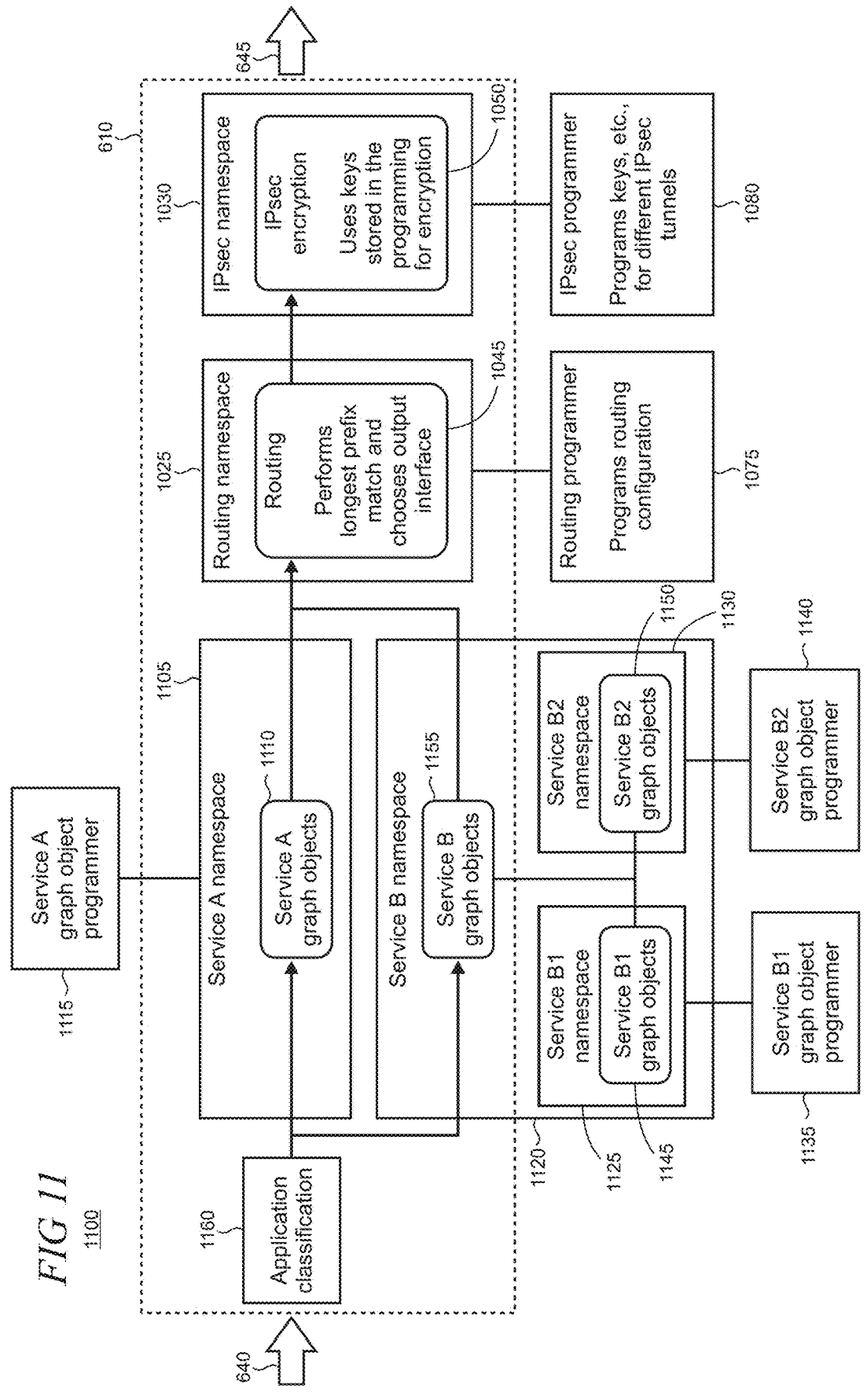
FIG. 11 shows an illustrative directed graph that is composed of services programmed using a layered approach in which some namespaces are hidden.

The use of multiple namespaces and associated programming domains may be extended to create more complex services. FIG. 11 shows an illustrative directed graph 1100 that is composed of multiple constituent services that are programmed using a layered approach in which some namespaces are hidden from some users. In this example, the graph uses the routing namespace 1025 and IPsec namespace 1030 that are respectively associated with the routing programmer 1075 and IPsec programmer 1080, as in the previous example.

There are two additional services, A and B, that are utilized, as shown in the drawing, in which service A uses a single namespace 1105 that contains service A graph objects 1110 which are accessed via a service A graph object programmer 1115. The namespace 1120 for service B contains two namespaces within it-a service B1 namespace 1125 and a service B2 namespace 1130 that are respectively associated with a service B1 graph object programmer 1135 and a service B2 graph object programmer 1140. The service B1 namespace contains service B1 graph objects 1145 and the service B2 namespace contains service B2 graph objects 1150. The graph objects for services B1 and B2 are combined into service B graph objects 1155. As discussed above, the service programming for each namespace is mapped into the single directed graph 1100 that controls processing of the packet processing pipeline 610.

The packet processing pipeline 610 supports flows through either service A or B programming based on application classification 1160. The traffic flows from the application classification to a given service based on the graph objects contained in that service.

The illustrative example shown in FIG. 11 highlights how services can be built up from programming in different namespaces that can be layered or nested. In addition, some namespaces can be hidden or private. For example, the service B graph objects use objects from the B1 and B2 namespaces that are not visible, so these namespaces can be considered private to service B.

FIG. 12 is a flowchart of an illustrative method 1200 for operating a data packet processing pipeline in a network. Unless specifically stated, methods or steps shown in the flowchart blocks and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Block 1205 includes instantiating the data packet processing pipeline on a programmable data plane of the computing device, the pipeline having a plurality of processing stages comprising configurable graph objects arranged in a directed graph, wherein the pipeline processes data packets through the plurality of processing stages according to the directed graph. Block 1210 includes enabling programming of the graph objects in the processing stages using a plurality of unique namespaces, each namespace encapsulating associated graph object programming within a predefined scope. Block 1215 includes providing a plurality of user programming interfaces to the directed graph, each user programming interface being associated with a namespace corresponding with one or more graph objects, wherein programming of graph objects through a user programming interface is bound to its associated namespace to provide programming isolation among the processing stages.

FIG. 13 is a flowchart of an illustrative method 1300 that may be executed by a computing device in an SDN network. Block 1305 includes implementing a multi-stage data packet processing pipeline that is supported across a plurality of domains respectively associated with a plurality of different tenants. Block 1310 includes utilizing a directed graph of configurable graph objects to control operations of stages of the data packet processing pipeline, the graph objects including nodes defining match-action classifiers and edges defining data packet flows through the data packet processing pipeline based on matches, and wherein sets of one or more graph objects are grouped within respective discrete namespaces in the directed graph.

Block 1315 includes associating a unique user programming interface, among a plurality of unique user programming interfaces, with each set of graph objects as grouped by discrete namespace, wherein each unique user programming interface is limited to programming for only an associated set of graph objects. Block 1320 includes assigning ones of the plurality of unique user programming interfaces to respective ones of the different tenants, each tenant being enabled to program stages of the data packet processing pipeline using an assigned unique user programming interface.

FIG. 14 is a flowchart of an illustrative method 1400 that may be performed by a computing device. Block 1405 includes implementing a data packet processing pipeline supported in a cloud-computing network configured with an SDN architecture supporting multiple tenants, wherein the data packet processing pipeline is programmatically-operated according to a directed graph. Block 1410 includes supporting a user programming domain for the data packet processing pipeline in which the directed graph comprises user-programmed graph objects grouped into programming containers identified by unique namespaces.

Block 1415 includes providing access to tenants to selected ones of the namespaces to generate programming for the data packet processing pipeline with user-programmed graph objects. Block 1420 includes supporting an execution domain for the data packet processing pipeline in which the programming is converted into executable code running on a single data plane of physical network infrastructure in the cloud-computing network.

Figure 15:
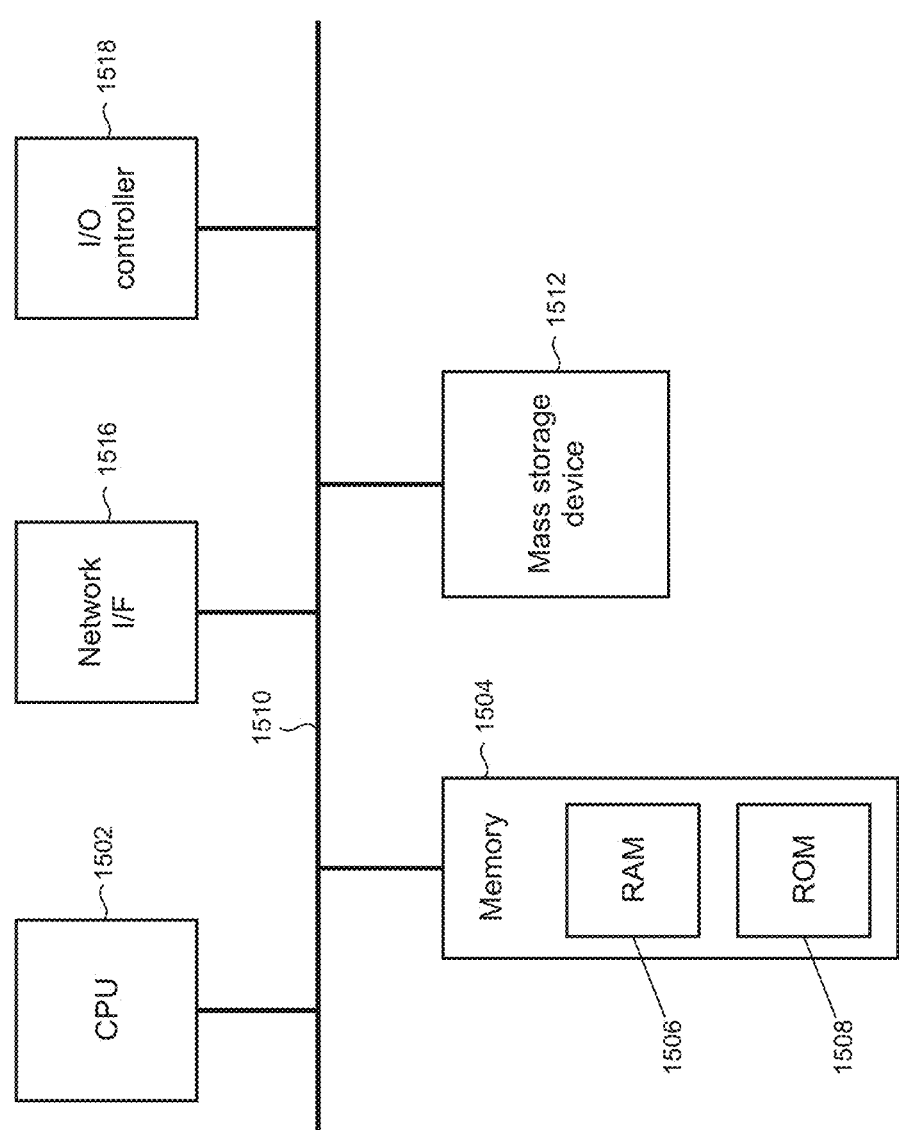
FIG. 15 is a block diagram of an illustrative server or computing device that may be used at least in part to implement the present namespaces for protected multi-tenant packet processing pipelines.

FIG. 15 shows an illustrative architecture 1500 for a computing device, such as a server, capable of executing the various components described herein for the present namespaces for protected multi-tenant packet processing pipelines. The architecture 1500 illustrated in FIG. 15 includes one or more processors 1502 (e.g., central processing unit, dedicated AI chip, graphics processing unit, etc.), a system memory 1504, including RAM (random access memory) 1506 and ROM (read only memory) 1508, and a system bus 1510 that operatively and functionally couples the components in the architecture 1500. A basic input/output system containing the basic routines that help to transfer information between elements within the architecture 1500, such as during startup, is typically stored in the ROM 1508. The architecture 1500 further includes a mass storage device 1512 for storing software code or other computer-executed code that is utilized to implement applications, a file system, and an operating system (OS). The mass storage device 1512 is connected to the processor 1502 through a mass storage controller (not shown) connected to the bus 1510. The mass storage device 1512 and its associated computer-readable storage media provide non-volatile storage for the architecture 1500. Although the description of computer-readable storage media contained herein refers to a mass storage device, such as a hard disk or CD-ROM drive, it may be appreciated by those skilled in the art that computer-readable storage media can be any available storage media that can be accessed by the architecture 1500.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray or other optical storage, magnetic cassettes, magnetic tape, magnetic disk storage or other magnetic storage devices, or any other medium which can be used to store the desired information and which can be accessed by the architecture 1500.

According to various embodiments, the architecture 1500 may operate in a networked environment using logical connections to remote computers through a network. The architecture 1500 may connect to the network through a network interface unit 1516 connected to the bus 1510. It may be appreciated that the network interface unit 1516 also may be utilized to connect to other types of networks and remote computer systems. The architecture 1500 also may include an input/output controller 1518 for receiving and processing input from a number of other devices, including a keyboard, mouse, touchpad, touchscreen, control devices such as buttons and switches or electronic stylus (not shown in FIG. 15). Similarly, the input/output controller 1518 may provide output to a display screen, user interface, a printer, or other type of output device (also not shown in FIG. 15).

It may be appreciated that the software components described herein may, when loaded into the processor 1502 and executed, transform the processor 1502 and the overall architecture 1500 from a general-purpose computing system into a special-purpose computing system customized to facilitate the functionality presented herein. The processor 1502 may be constructed from any number of transistors or other discrete circuit elements, which may individually or collectively assume any number of states. More specifically, the processor 1502 may operate as a finite-state machine, in response to executable instructions contained within the software modules disclosed herein. These computer-executable instructions may transform the processor 1502 by specifying how the processor 1502 transitions between states, thereby transforming the transistors or other discrete hardware elements constituting the processor 1502.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1500 in order to store and execute the software components presented herein. It also may be appreciated that the architecture 1500 may include other types of computing devices, including wearable devices, handheld computers, embedded computer systems, smartphones, PDAs, and other types of computing devices known to those skilled in the art. It is also contemplated that the architecture 1500 may not include all of the components shown in FIG. 15, may include other components that are not explicitly shown in FIG. 15, or may utilize an architecture completely different from that shown in FIG. 15.

Figure 16:
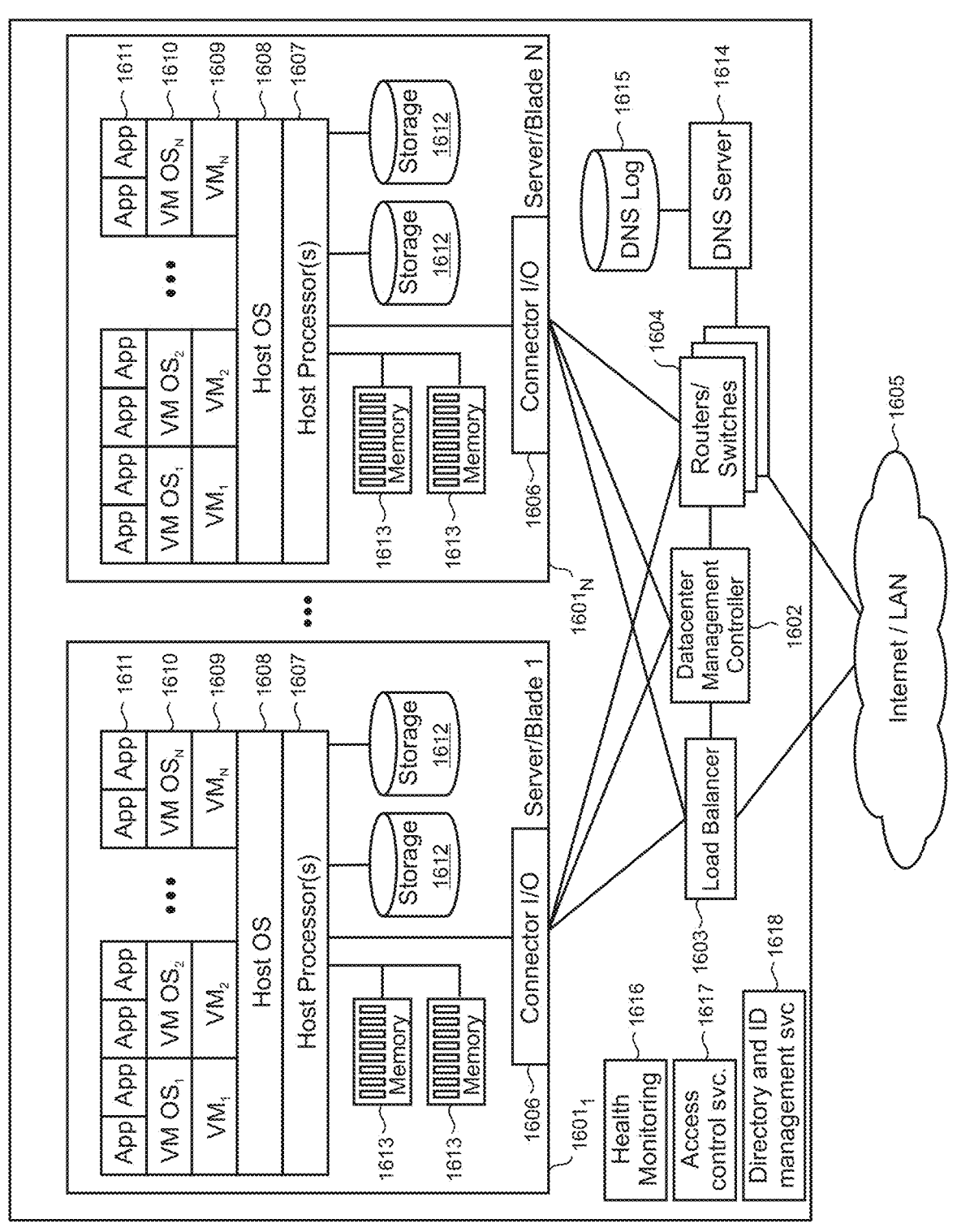
FIG. 16 is a block diagram of an illustrative datacenter that may be used at least in part to implement the present namespaces for protected multi-tenant packet processing pipelines.

FIG. 16 is a high-level block diagram of an illustrative datacenter 1600 that provides cloud computing services or distributed computing services that may be used to implement the present namespaces for protected multi-tenant packet processing pipelines. Datacenter 1600 may incorporate one or more of the features disclosed in the DCs shown in the drawings and described in the accompanying text. A plurality of servers 1601 are managed by datacenter management controller 1602. Load balancer 1603 distributes requests and computing workloads over servers 1601 to avoid a situation wherein a single server may become overwhelmed. Load balancer 1603 maximizes available capacity and performance of the resources in datacenter 1600. Routers/switches 1604 support data traffic between servers 1601 and between datacenter 1600 and external resources and users (not shown) via an external network 1605, which may be, for example, a local area network (LAN) or the Internet.

Servers 1601 may be standalone computing devices, and/or they may be configured as individual blades in a rack of one or more server devices. Servers 1601 have an input/output (I/O) connector 1606 that manages communication with other database entities. One or more host processors 1607 on each server 1601 run a host OS 1608 that supports multiple virtual machines (VM) 1609. Each VM 1609 may run its own OS so that each VM OS 1610 on a server is different, or the same, or a mix of both. The VM OSs 1610 may be, for example, different versions of the same OS (e.g., different VMs running different current and legacy versions of the Windows® operating system). In addition, or alternatively, the VM OSs 1610 may be provided by different manufacturers (e.g., some VMs running the Windows® operating system, while other VMs are running the Linux® operating system). Each VM 1609 may also run one or more applications (Apps) 1611. Each server 1601 also includes storage 1612 (e.g., hard disk drives (HDD)) and memory 1613 (e.g., RAM) that can be accessed and used by the host processors 1607 and VMs 1609 for storing software code, data, etc.

Datacenter 1600 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 1600 allows tenants to scale resources up or down dynamically to meet the current needs of their businesses. Additionally, a datacenter operator can provide usage-based services to tenants so that they pay for only the resources they use, when they need to use them. For example, a tenant may initially use one VM 1609 on server $1601_1$ to run their applications 1611. When demand for an application 1611 increases, the datacenter 1600 may activate additional VMs 1609 on the same server $1601_1$ and/or on a new server $1601_N$ as needed. These additional VMs 1609 can be deactivated if demand for the application later drops.

Datacenter 1600 may offer guaranteed availability, disaster recovery, and back-up services. For example, the datacenter may designate one VM 1609 on server $1601_1$ as the primary location for the tenant's application and may activate a second VM 1609 on the same or a different server as a standby or back-up in case the first VM or server $1601_1$ fails. The datacenter management controller 1602 automatically shifts incoming user requests from the primary VM to the back-up VM without requiring tenant intervention. Although datacenter 1600 is illustrated as a single location, it will be understood that servers 1601 may be distributed to multiple locations across the globe to provide additional redundancy and disaster recovery capabilities. Additionally, datacenter 1600 may be an on-premises, private system that provides services to a single enterprise user or may be a publicly accessible, distributed system that provides services to multiple, unrelated customers and tenants or may be a combination of both.

Domain Name System (DNS) server 1614 resolves domain and host names into IP addresses for all roles, applications, and services in datacenter 1600. DNS log 1615 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Datacenter health monitoring 1616 monitors the health of the physical systems, software, and environment in datacenter 1600. Health monitoring 1616 provides feedback to datacenter managers when problems are detected with servers, blades, processors, or applications in datacenter 1600, or when network bandwidth or communications issues arise.

Access control service 1617 determines whether users are allowed to access particular connections and services provided at the datacenter 1600. Directory and identity management service 1618 authenticates user credentials for tenants on datacenter 1600.

Figure 17:
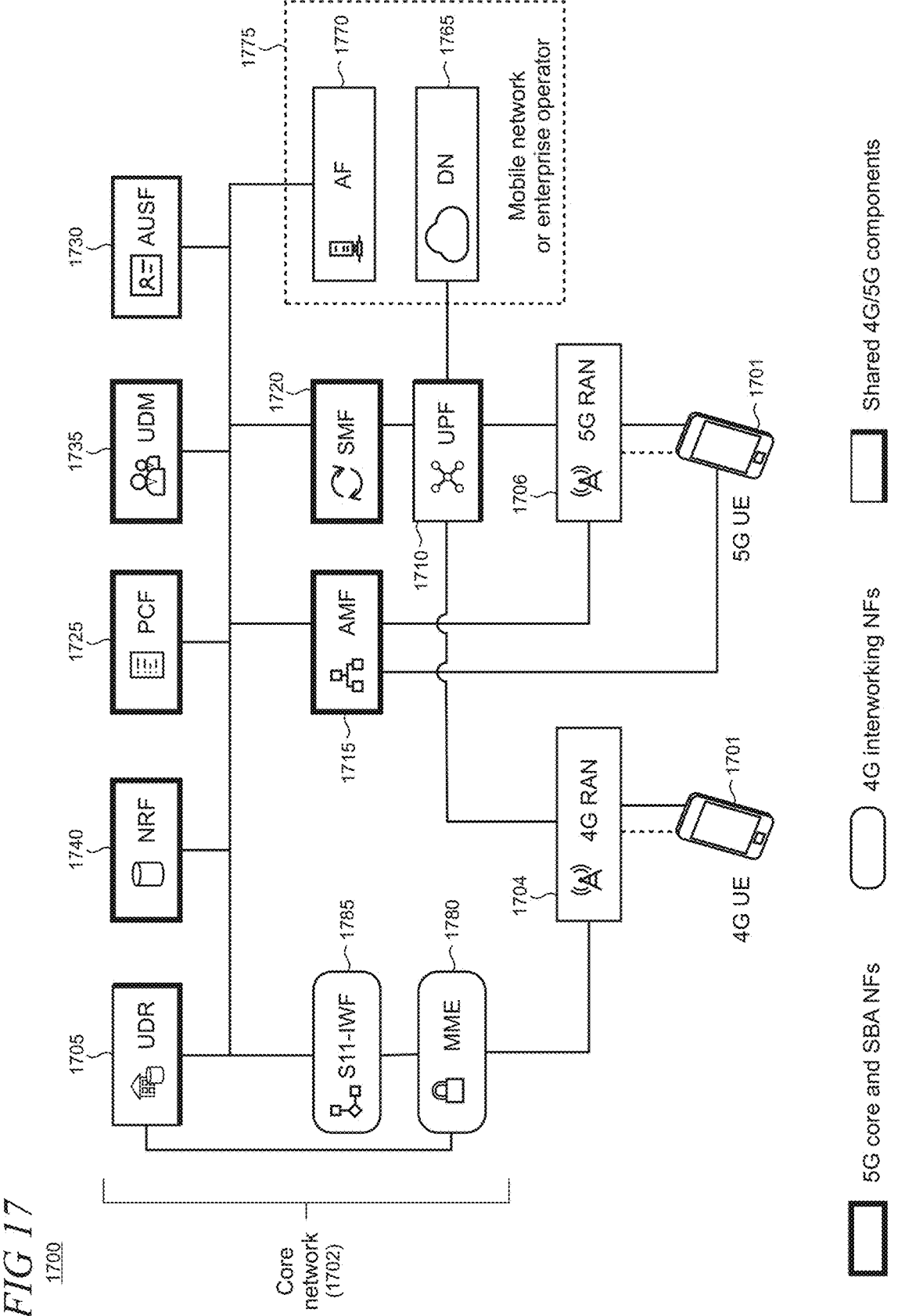
FIG. 17 shows details of an illustrative 4G/5G core network implemented using an SDN architecture.

FIG. 17 shows an illustrative mobile network that uses a service-based architecture (SBA) 1700 as defined by the 3GPP (3rd Generation Partnership Project). An SBA provides a modular framework from which common applications can be deployed using components of varying sources and vendors. Control plane functionality and common data repositories of the network are delivered by way of a set of Network Functions (NFs) that are interconnected with a service-based interface bus, in which each has authorization to access each other's services. Assuming the role of either service consumer or service producer, NFs are self-contained, independent, and reusable. Each NF service exposes its functionality through a Service Based Interface (SBI), which employs a well-defined REST (Representational State Transfer) interface using HTTP/2 (Hypertext Transfer Protocol Version 2).

As shown, the mobile network includes a CN 1702 that is interoperable with 4G (4$^{th}$ generation) and 5G RANs 1704 and 1706 that support wireless communications with UE 1701. The SBA architecture 1700 supports a 5G next generation core (NGC) network that includes 4G evolved packet core (EPC) instances to enable some 4G LTE (Long Term Evolution) use cases when implementing the present principles. With 4G mode, some 5G components such as the UDR (unified data repository) 1705 and UPF (user plane function) 1710 support 4G mode without the need to revert to a legacy 4G stack. Other 4G components include an MME (mobility management entity) 1780 and IWF (interworking function) 1785.

The UPF handles user data, performing operations such as maintaining PDU (Protocol Data Unit) sessions, packet routing and forwarding, packet inspection, policy enforcement for the user plane, QoS handling, traffic usage reporting for billing, and the like. The UPF further provides an interconnection point between the mobile network infrastructure and an external DN 1765. The AF (application function) 1770 provides service or application related information to a VNF service consumer, for example, a mobile network or enterprise operator 1775.

The AMF (access and mobility management function) 1715 receives all connection and session related information from the UE 1701 but is only responsible for handling connection and mobility management tasks such as registration and authentication, identification, and mobility. All messages related to session management are forwarded over an interface to the Session Management Function (SMF) 1720 that establishes and manages sessions. It also selects and controls the UPF 1710 and handles paging. The AF 1770 provides service or application related information to the NF service consumer. For example, the AF performs operations such as retrieving resources and exposing services to end-users. Other 3GPP-defined 5G network functions in the architecture 1700 include SMF (session management function) 1720; PCF (policy control function) 1725; AUSF (authentication server function 1730; UDM (unified data management) 1735; and NRF (network repository function) 1740.

Various exemplary embodiments of the present namespaces for protected multi-tenant packet processing pipelines are now presented by way of illustration and not as an exhaustive list of all embodiments. An example includes a method, operable on a computing device, for operating a data packet processing pipeline in a network, comprising: instantiating the data packet processing pipeline on a programmable data plane of the computing device, the pipeline having a plurality of processing stages comprising configurable graph objects arranged in a directed graph, wherein the pipeline processes data packets through the plurality of processing stages according to the directed graph; enabling programming of the graph objects in the processing stages using a plurality of unique namespaces, each namespace encapsulating associated graph object programming within a predefined scope; and providing a plurality of user programming interfaces to the directed graph, each user programming interface being associated with a namespace corresponding with one or more graph objects, wherein programming of graph objects through a user programming interface is bound to its associated namespace to provide programming isolation among the processing stages.

In another example, the method further includes distributing the plurality of programming interfaces to the directed graph across different tenant domains. In another example, the graph objects comprise nodes, including match-action classifiers and interfaces, and further comprise edges including matches that represent data flows through the processing stages. In another example, the match-action classifiers apply match-action rules to process data packets. In another example, the method further includes converting the directed graph into code that executes on the programmable data plane to operate the data packet processing pipeline. In another example, each namespace is further arranged to define an application programming interface (API) that is globally accessible by other namespaces and further defining interfaces to resources in the network. In another example, the computing device is incorporated into infrastructure underlying a software-defined networking (SDN) network.

A further example includes one or more hardware-based non-transitory computer-readable memory devices storing computer-executable instructions which, upon execution by one or more processors disposed in a computing device in a software-defined networking (SDN) network, cause the computing device to: implement a multi-stage data packet processing pipeline that is supported across a plurality of domains respectively associated with a plurality of different tenants; utilize a directed graph of configurable graph objects to control operations of stages of the data packet processing pipeline, the graph objects including nodes defining match-action classifiers and edges defining data packet flows through the data packet processing pipeline based on matches, and wherein sets of one or more graph objects are grouped within respective discrete namespaces in the directed graph; associate a unique user programming interface, among a plurality of unique user programming interfaces, with each set of graph objects as grouped by discrete namespace, wherein each unique user programming interface is limited to programming for only an associated set of graph objects; and assign ones of the plurality of unique user programming interfaces to respective ones of the different tenants, each tenant being enabled to program stages of the data packet processing pipeline using an assigned unique user programming interface.

In another example, each discrete namespace provides encapsulation for the programming of the associated set of graph objects to restrict access from other ones of the plurality of the unique programming interfaces. In another example, the one or more hardware-based non-transitory computer-readable memory devices further include configuring one or more of the discrete namespaces to define public application programming interfaces (APIs). In another example, the one or more hardware-based non-transitory computer-readable memory devices further include configuring one or more of the discrete namespaces to define public interfaces to SDN network resources. In another example, the match-action classifiers specify filtering criteria for data packets and actions for performing responsive to a data packet matching specified filtering criteria. In another example, the match-action classifiers apply match-action rules to process data packets in the data packet processing pipeline. In another example, the match-action rules comprise one of exact match, longest-prefix match, bloom filter match, or regular expression match. In another example, the data packet processing pipeline is instantiated in a programmable data plane in the SDN network.

A further example includes a computing device, comprising: a processor; a hardware-based non-transitory computer-readable storage device having computer-executable instructions stored thereon which, when executed by the processor, cause the computing device to: implement a data packet processing pipeline supported in a cloud-computing network configured with an SDN (software-defined networking) architecture supporting multiple tenants, wherein the data packet processing pipeline is programmatically-operated according to a directed graph; support a user programming domain for the data packet processing pipeline in which the directed graph comprises user-programmed graph objects grouped into programming containers identified by unique namespaces; provide access to tenants to selected ones of the namespaces to generate programming for the data packet processing pipeline with user-programmed graph objects; and support an execution domain for the data packet processing pipeline in which the programming is converted into executable code running on a single data plane of physical network infrastructure in the cloud-computing network.

In another example, the graph objects include nodes comprising processing elements and edges comprising packet flow among the processing elements. In another example, the namespaces define public interfaces accessible by programming in the namespaces and interfaces to SDN resources. In another example, the computing device is instantiated in physical network infrastructure used in a 4G (4th generation) or a 5G (5th generation) mobile network. In another example, the physical network infrastructure comprises packet-forwarding devices including one of switch, router, or firewall.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method, operable on a computing device, for operating a data packet processing pipeline in a network, comprising:

instantiating the data packet processing pipeline on a programmable data plane of the computing device, the pipeline having a plurality of processing stages comprising configurable graph objects arranged in a directed graph, wherein the pipeline processes data packets through the plurality of processing stages according to the directed graph;

enabling programming of the graph objects in the processing stages using a plurality of unique namespaces, each namespace encapsulating associated graph object programming within a predefined scope; and providing a plurality of user programming interfaces to the directed graph, each user programming interface being associated with a namespace corresponding with one or more graph objects, wherein programming of graph objects through a user programming interface is bound to its associated namespace to provide programming isolation among the processing stages.

2. The method of claim 1 further including distributing the plurality of programming interfaces to the directed graph across different tenant domains.

3. The method of claim 1 in which the graph objects comprise nodes, including match-action classifiers and interfaces, and further comprise edges including matches that represent data flows through the processing stages.

4. The method of claim 3 in which the match-action classifiers apply match-action rules to process data packets.

5. The method of claim 1 further including converting the directed graph into code that executes on the programmable data plane to operate the data packet processing pipeline.

6. The method of claim 1 further arranging each namespace to define an application programming interface (API) that is globally accessible by other namespaces and further defining interfaces to resources in the network.

7. The method of claim 1 in which the computing device is incorporated into infrastructure underlying a software-defined networking (SDN) network.

8. One or more hardware-based non-transitory computer-readable memory devices storing computer-executable instructions which, upon execution by one or more processors disposed in a computing device in a software-defined networking (SDN) network, cause the computing device to:

implement a multi-stage data packet processing pipeline that is supported across a plurality of domains respectively associated with a plurality of different tenants;

utilize a directed graph of configurable graph objects to control operations of stages of the data packet processing pipeline, the graph objects including nodes defining match-action classifiers and edges defining data packet flows through the data packet processing pipeline based on matches, and wherein sets of one or more graph objects are grouped within respective discrete namespaces in the directed graph;

associate a unique user programming interface, among a plurality of unique user programming interfaces, with each set of graph objects as grouped by discrete namespace, wherein each unique user programming interface is limited to programming for only an associated set of graph objects; and assign ones of the plurality of unique user programming interfaces to respective ones of the different tenants, each tenant being enabled to program stages of the data packet processing pipeline using an assigned unique user programming interface.

9. The one or more hardware-based non-transitory computer-readable memory devices of claim 8 in which each discrete namespace provides encapsulation for the programming of the associated set of graph objects to restrict access from other ones of the plurality of the unique programming interfaces.

10. The one or more hardware-based non-transitory computer-readable memory devices of claim 8 further including configuring one or more of the discrete namespaces to define public application programming interfaces (APIs).

11. The one or more hardware-based non-transitory computer-readable memory devices of claim 8 further including configuring one or more of the discrete namespaces to define public interfaces to SDN network resources.

12. The one or more hardware-based non-transitory computer-readable memory devices of claim 8 in which the match-action classifiers specify filtering criteria for data packets and actions for performing responsive to a data packet matching specified filtering criteria.

13. The one or more hardware-based non-transitory computer-readable memory devices of claim 8 in which the match-action classifiers apply match-action rules to process data packets in the data packet processing pipeline.

14. The one or more hardware-based non-transitory computer-readable memory devices of claim 13 wherein the match-action rules comprise one of exact match, longest-prefix match, bloom filter match, or regular expression match.

15. The one or more hardware-based non-transitory computer-readable memory devices of claim 8 in which the data packet processing pipeline is instantiated in a programmable data plane in the SDN network.

16. A computing device, comprising:

a processor;

a hardware-based non-transitory computer-readable storage device having computer-executable instructions stored thereon which, when executed by the processor, cause the computing device to:

implement a data packet processing pipeline supported in a cloud-computing network configured with an SDN (software-defined networking) architecture supporting multiple tenants, wherein the data packet processing pipeline is programmatically-operated according to a directed graph;

support a user programming domain for the data packet processing pipeline in which the directed graph comprises user-programmed graph objects grouped into programming containers identified by unique namespaces;

provide access to tenants to selected ones of the namespaces to generate programming for the data packet processing pipeline with user-programmed graph objects; and support an execution domain for the data packet process-
ing pipeline in which the programming is converted
into executable code running on a single data plane of
physical network infrastructure in the cloud-computing
network.

17. The computing device of claim 16 in which the graph
objects include nodes comprising processing elements and
edges comprising packet flow among the processing ele-
ments.

18. The computing device of claim 17 in which the
namespaces define public interfaces accessible by program-
ming in the namespaces and interfaces to SDN resources.

19. The computing device of claim 16 instantiated in
physical network infrastructure used in a 4G ($4^{th}$ generation)
or a 5G ($5^{th}$ generation) mobile network.

20. The computing device of claim 19 in which the
physical network infrastructure comprises packet-forward-
ing devices including one of switch, router, or firewall.

\* \* \* \* \*